June 22, 1965  F. H. ROHR ETAL  3,190,999

WELDING SYSTEM FOR HONEYCOMB CORE

Original Filed April 17, 1961  8 Sheets-Sheet 1

INVENTORS.
F. H. ROHR
E. M. LACEY
BY George E. Pearson
ATTORNEY

FIG. 3

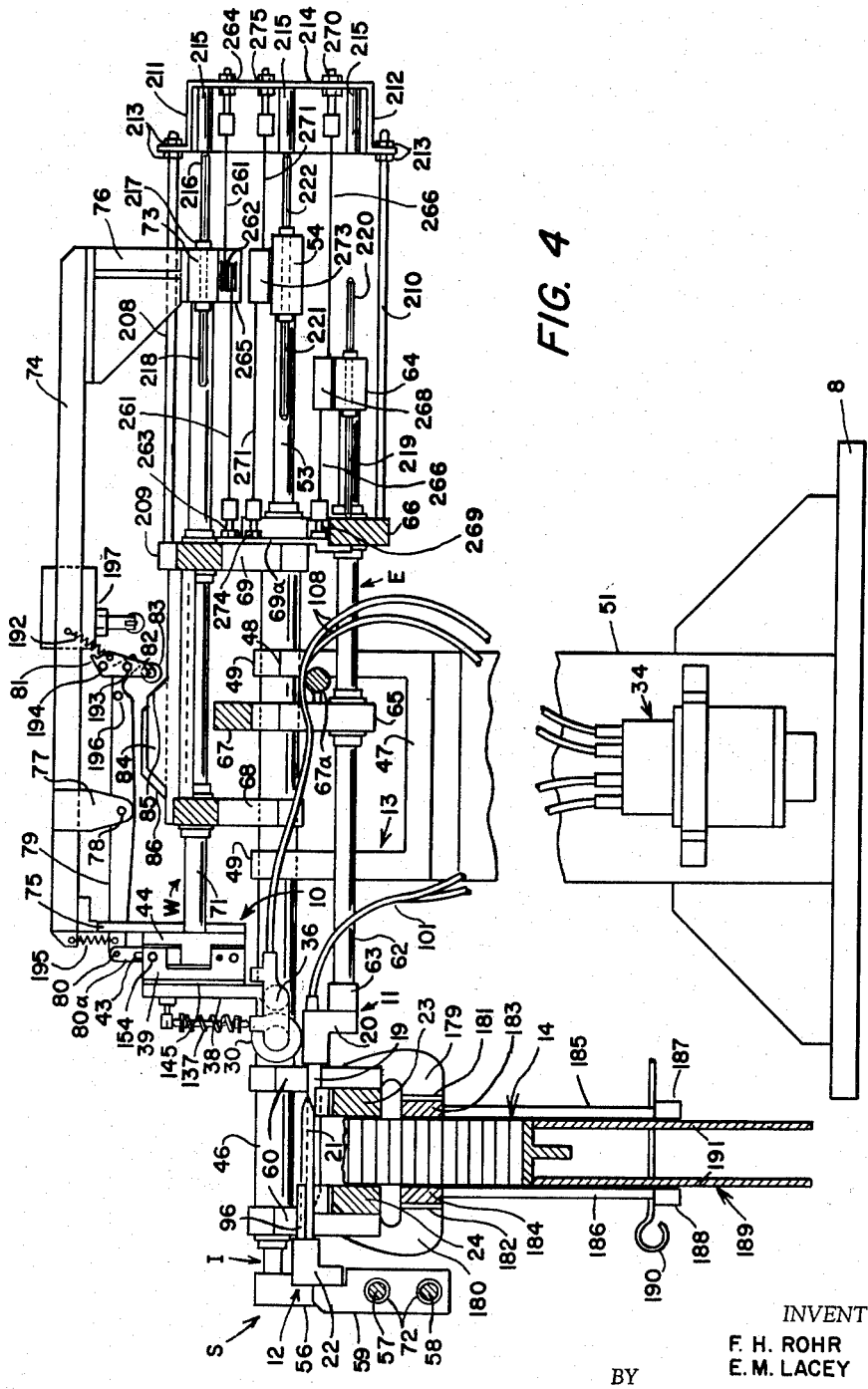

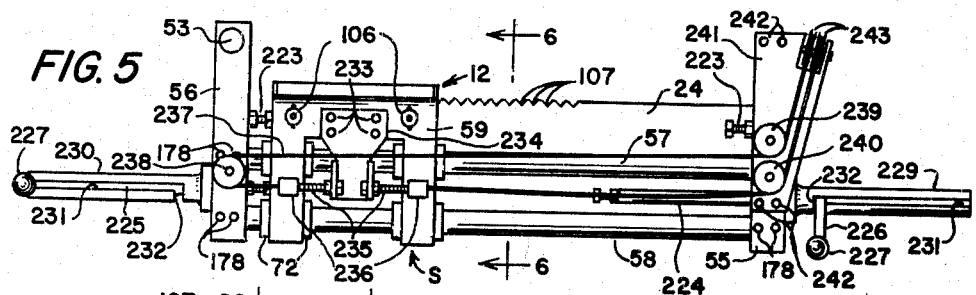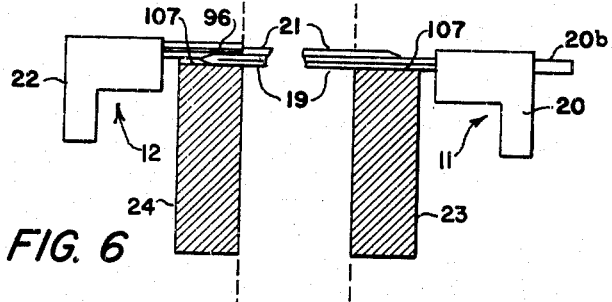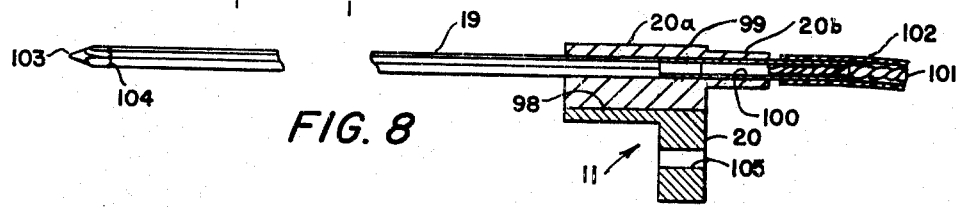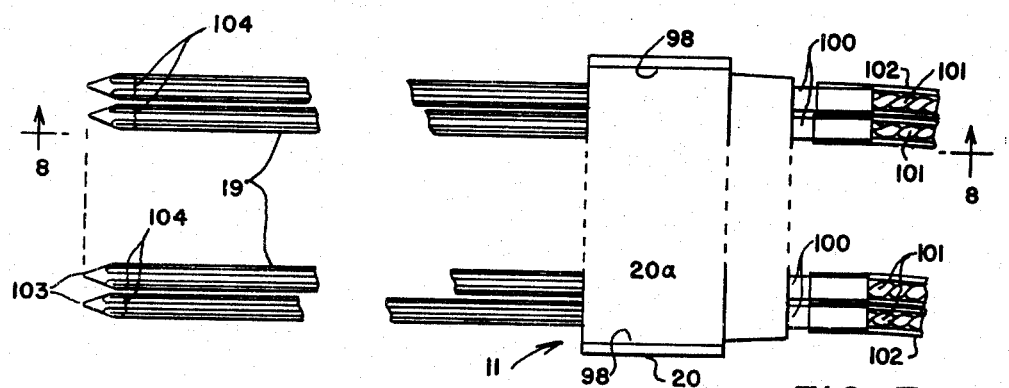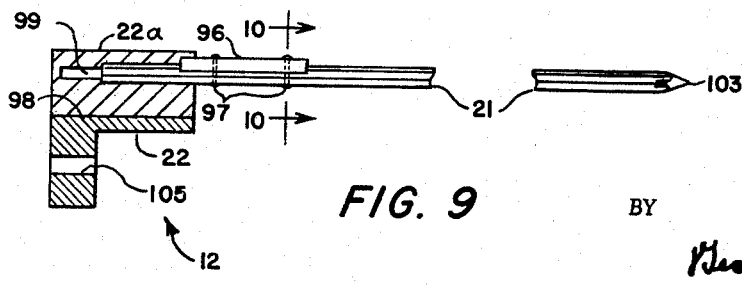

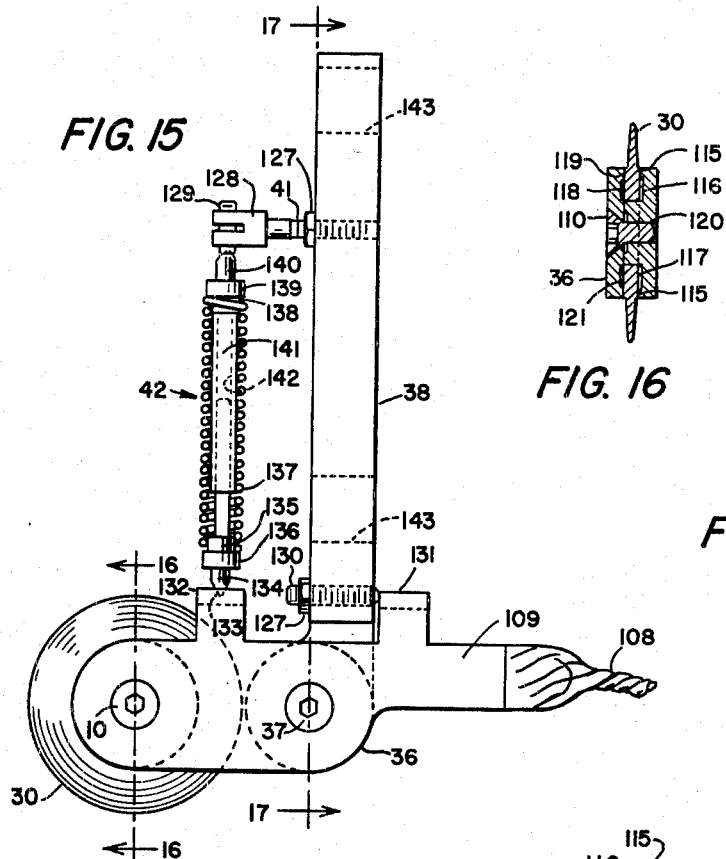

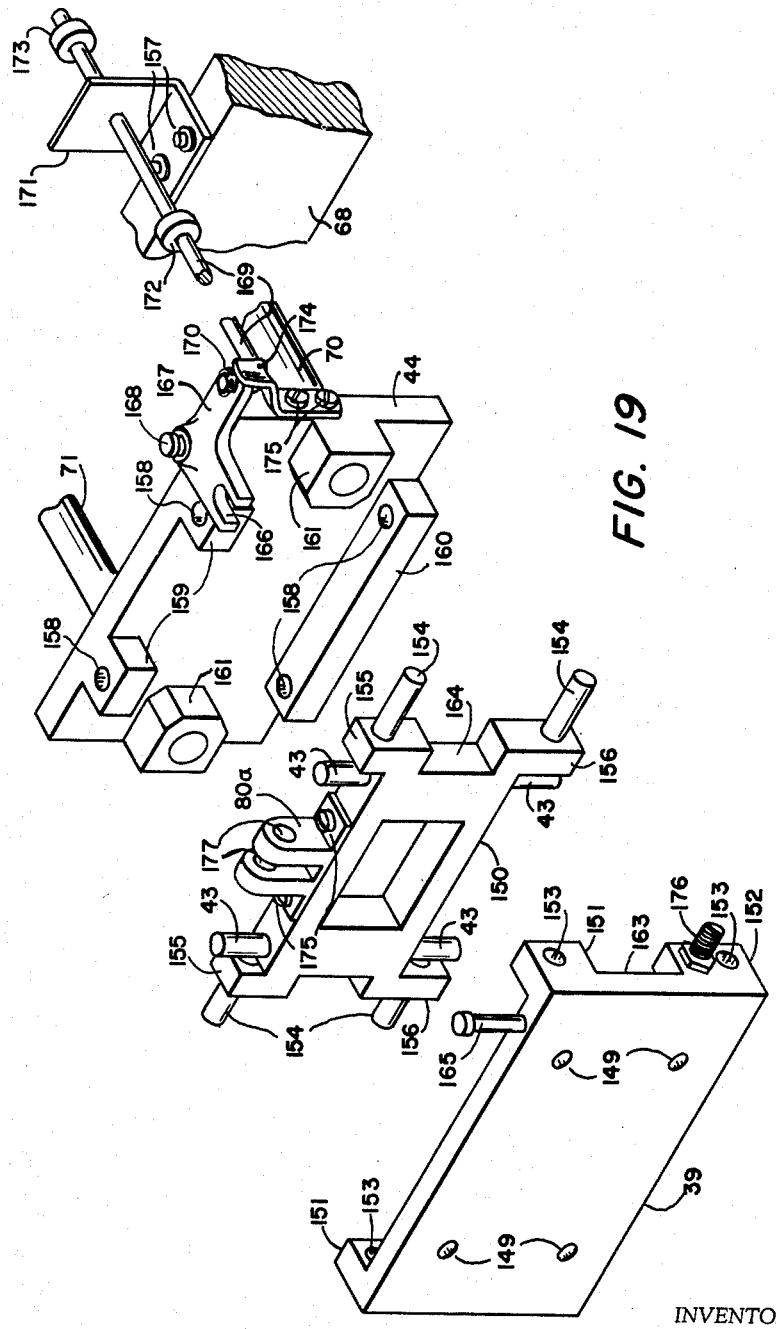

3,190,999
WELDING SYSTEM FOR HONEYCOMB CORE
Fred H. Rohr, San Diego, and Elbert M. Lacey, Chula
 Vista, Calif., assignors to Rohr Corporation, Chula
 Vista, Calif., a corporation of California
Original application Apr. 17, 1961, Ser. No. 103,589, now
 Patent No. 3,077,533, dated Feb. 12, 1963. Divided
 and this application June 29, 1962, Ser. No. 207,163
13 Claims. (Cl. 219—80)

This invention relates generally to apparatus for fabricating honeycomb core and more particularly to a welding system having particular utility when used with the honeycomb core fabricating apparatus disclosed in the copending application for Novel Framework for Honeycomb Core Machine, Serial Number 103,589, filed April 17, 1961, now Patent No. 3,077,533, of which this patent application is a division.

Although not limited thereto, the welding system of the present application and the apparatus disclosed therewith in the aforesaid copending application are particularly well suited for use in providing the basic welding pin, wheel, and core shuttling movements disclosed and claimed in the copending application of Fred H. Rohr for Method and Apparatus for Fabricating Honeycomb Core, Serial Number 846,903, filed October 16, 1959, now Patent No. 3,079,487.

Many manufacturing processes—such as welding—require that several parts be brought together and assembled precisely at the work station; held at the work station in such assembled relation for the duration of the welding period; and then shuttled out of the work area to make way for successive parts to be introduced, assembled, and acted upon within the work station. A situation of this type arises in the fabrication of so-called "honeycomb core" that is widely used in airplanes for low-weight, high-strength structure. In the fabrication of this honeycomb core, strip feed and corrugation means operate in timed relation cooperatively with internesting electrode and indexing pins which serve to move sections of corrugated metal ribbon or strips into juxtaposed alignment so that the troughs of one strip rest on the crests of another strip preparatory to the welding of the same together. The strips are then held in this position while coacting electrode pins and welding wheels pass the welding current through the abutting and juxtaposed nodes of the adjacent crests and troughs to thus weld the same together and form cells of the honeycomb core. When selected crests and troughs have been welded together, the electrode pins and welding members are withdrawn from the thusly formed cells and, following the shuttling of the core by the indexing pins, re-inserted and re-applied as the process is repeated, as necessary, to complete the core.

For a completely satisfactory result, providing high quality honeycomb core, the corrugating and juxtapositioning of the strip sections must be very precise, the abutting nodes to be welded must be critically positioned above the electrode pins, and the welding wheels must be caused to track precisely above and along the electrode pins in order properly to pass the welding current therebetween and through the abutting nodes, all in a manner to form optimum welds in the nodal areas while avoiding burning of the thin stainless steel ribbon material at the sides of the nodes. To this end, the pressure, movement, and electrical contacting of the welding members, particularly the electrical circuit continuity through the welding wheels must be critically controlled; and the precision positioning, alignment, and relative movement of parts must persist repetitively in the cell-to-cell formation throughout the length and width of the core. It follows therefore, that the welding members per se must be adapted to maintain structural integrity and fixed operative relationships as well as electrical circuit continuity during the welding process and, to this end, the framework structures and surfaces the support and guide the positioning and welding members must be strong, sturdy, and carefully aligned. These framework and supporting structures, moreover, like the welding members per se, must be capable of retaining their relationship during the welding process and, in addition, repetitively retain such structural integrity and relationship of the parts during the shuttling and other movements preparatory to welding of successive sections of the ribbon material.

Various honeycomb core fabricating machines employing internesting electrode fingers and coacting welding wheels have heretofor been devised and used with varying degrees of success. In the past, for example, the electrode pins have been clamped in mutually spaced and parallel relationship to a common support bar which also served as a conductor in the electrical welding circuit, the arrangement being such that current would enter one wheel and pass through a first pair of abutting nodes to a first electrode pin and then pass through the support bars to the second electrode pin from whence the current would pass through a second pair of abutting nodes to a second wheel at the other end of the welding circuit. Although this arrangement has the important advantage of simplicity in that terminals are required only for the pair of wheels in the series circuit, the electrode pins being intermediate elements in this circuit, the series circuit arrangement has the disadvantage in that inordinately high resistance or low contact pressure of one wheel and electrode pin in the series circuit affects the welding current available to the other wheel and electrode pin of the series circuit. In the clamping of the electrode pins to the common support bar, moreover, electrical difficulties are encountered due to variations in the clamping resistance of the several pins, and mechanical difficulties arise in achieving precise positioning and spacing of the clamped pins.

In accordance with the improved welding system of the present invention, improvements are provided in the construction, shape, mounting, movements, and electrical circuitry and conductivity of the internesting indexing and electrode pins and in their coacting welding wheels. Indexing and electrode pin assemblies, for example, are each unitized in the form of modular components to facilitate interchange of the units, and the pins are potted in plastic for precision spacing of both indexing and electrode pins and to provide electrical insulation for the electrode pins. The pins, moreover, are specially shaped and constructed to minimize wear in engagement with the ribbons upon movements of the pins into the cells of the core and to clear perforations in the ribbons which extend into the cells of the core.

Each welding wheel together with its associated mounting and contact pressurizing structure is likewise unitized in the form of a modulator component to facilitate interchange of welding wheel units and to give each unit control of its wheel contact pressure and to minimize the electrical contact resistance introduced by the wheel into the unit welding circuit which is made individual to each wheel.

The wheel assemblies or units are mounted together, for ribbon engaging movements of the wheels, on an improved welding head having provision for welding optionally in one direction only as the wheels sweep over and along the electrode pins or, alternatively, for lateral shifting of the wheels to weld alternately spaced ribbon nodes on both forward and return sweeping movements of the welding wheels over and along the electrode pins.

Provision is further made: for precision shuttling movements of the indexing pins and core to assure alignment of successive ribbon nodes on the electrode pins; for air jet hold down of the ribbons on the electrode pins in an arrangement in which the air jets additionally serve to air cool the welding wheels; and for an anti-wobble construction and arrangement of the welding wheels to assure tracking of the wheels along the electrode pins. These and other improvements provide substantially constant conductivity in each welding wheel circuit and assure circuit continuity through the coacting wheels and pins.

Among the several objects, features and advantages of the welding system of the present invention therefore is the provision of an arrangement wherein each wheel and coacting electrode are separately energized from the current source, and each sub-assembly of the wheel and its mount, and the contact pressure control which is made individual to each wheel and sub-assembly, are made individually adjustable, mountable, and replaceable as a unit sub-assembly, or modular component, in the event of malfunctioning and need for replacement and repair.

As another object, feature and advantage of the present invention, provision is made for interchange of wheel sub-assemblies of different sizes in accordance with differences in cell sizes of core to be fabricated, and provision is further made for the precise shifting of the wheels when it is desired to weld alternate nodes in a forward sweep of the welding wheels across the core and to weld the intervening nodes on the return sweep of the welding wheels across the core. This movement is combined, moreover, with the required lowering and raising movement of the wheels as necessary to move them into and out of contact with the abutting ribbon nodes to be welded. This mounting means or welding head, and the movements effected thereby, assure alignment of the wheels with the electrode pins, notwithstanding the fact that the same wheels may be required to align with different electrode pins, as where the wheels are shifted to weld alternately spaced nodes, as aforedescribed.

As another object, feature and advantage of the present invention, the electrode pins and the indexing or shuttling pins of each group are precisely positioned and mutually spaced, as with the aid of jigs and dies, and then potted with a suitable plastic, each group in its holder, to thereby assure that the pins in their movements into and out of the cells of the core during fabrication of the same will retain the same spacing and will encounter the same freedom of entry and withdrawal without resulting premature wearing of the pins or impairment to the structural integrity of the core and its ribbon material. The electrode pins, being formed of highly conductive copper, are naturally subject to wear in engagement with the harder stainless steel material of which the core is fabricated and, accordingly, the tapered tips of the pins are coated with a hard plating such as chromium. The electrode and indexing pins are similarly molded in their respective holders with the molded plastic serving, as aforementioned, to precisely space and position the pins in each case, while also affording essential electrical insulation for the electrode pins. The electrode and indexing pin assemblies as thus provided, like the welding wheel sub-assemblies, are modular components which readily may be replaced in the event of malfunctioning and need for replacement and repair, it thus being possible to rapidly determine critical areas of malfunctioning of the machine, make the needed repairs and replacements, and expeditiously return the machine to production operation.

Still another object, feature and advantage of the welding system of the present invention which contributes to the precise tracking of the wheels along the nodes as well as to the quality and uniformity of the welds per se, resides in the provision of novel rotative support for the welding wheels wherein three critical and essential functions are afforded thereby, namely, true and rotative movement about the bearing axis, an absence of wobble from side to side on the bearing axis, and circuit continuity and conductivity compatible with the other circuit elements of the welding circuit.

Yet another object, feature and advantage of the welding system of the present invention is the provision for precise shuttling movement of the indexing pins whereby the core is moved thereby accurately in multiple increments of the spacings between adjacent nodes to thus assure that cells of the core into which the electrode fingers are to be inserted will always be aligned axially with the pins, and this being accomplished, notwithstanding the requirement of the indexing pins to shuttle the core in both directions longitudinally of the ribbons of the core.

Still another object, feature and advantage of the welding system of the present invention resides in the particular shaping, in cross section, of the electrode and indexing pins wherein the same are made to accommodate extruding portions of the cell walls of the corrugated ribbon resulting from the piercing of the same to provide gas escape openings in the cell walls of the fabricated core. Thus, although the protrusions of the perforations alternately face upwardly and downwardly as the continuous ribbon is folded back and forth upon itself, the pins are shaped in cross section so that the protrusions do not impair the otherwise free entry and withdrawal of the pins from the cells of the core.

An additional object, feature and advantage of the present invention is the provision of an air jet hold down which serves to urge the ribbon against the pins preparatory to and during welding of the same to the core, and also serves to cool the welding wheels during the welding process.

A principal object of the present invention therefore is to provide a new and improved welding system for fabricating honeycomb core having provision for precise tracking of the wheels across the aligned nodes of the ribbons to be welded together having provision for parallel relative movement of the wheels and pins parallel to the axes of the electrode and indexing pins, having provision for precise indexing movements of the wheels, pins and core relative to each other, and having provision for assuring circuit continuity and optimum conductivity for the purpose as well as optimum contact pressure of the welding wheels, while also having provision for ready assembly and replacement of parts.

Still other objects, features and advantages of the present invention are those inherent in the novel construction, combination and arrangement of parts comprising the welding system, presently to be described, which has been constructed in accordance with the best mode thus far devised for practicing the principles of the invention, reference being had to the accompanying drawings wherein:

FIG. 3 is a plan view of the machine shown in FIG. 2, certain parts being removed;

FIG. 4 is a view in section of the machine taken along the line 4—4 of FIG. 3;

FIG. 5 is a fragmentary front view of the machine;

FIG. 6 is an enlarged fragmentary sectional view as seen along the line 6—6 of FIG. 5;

FIG. 7 is a plan view of the electrode pin assembly;

FIG. 8 is a sectional view of the electrode pin assembly as seen along the line 8—8 of FIG. 7;

FIG. 9 is a sectional view of the indexing pin assembly, this view being similar to that of FIG. 8;

FIG. 10 is a sectional view of an indexing pin as seen along the line 10—10 of FIG. 9;

FIG. 15 is a side elevation of a wheel sub-assembly;

FIG. 16 is a sectional view of the wheel sub-assembly as viewed along the line 16—16 of FIG. 15;

FIG. 17 is a sectional view of the wheel sub-assembly as viewed along the line 17—17 of FIG. 15;

FIG. 18 is a fragmentary exploded view of the wheel sub-assembly of FIG. 15; and FIG. 19 is an exploded view of the mount for the wheel sub-assemblies.

Figure 2:
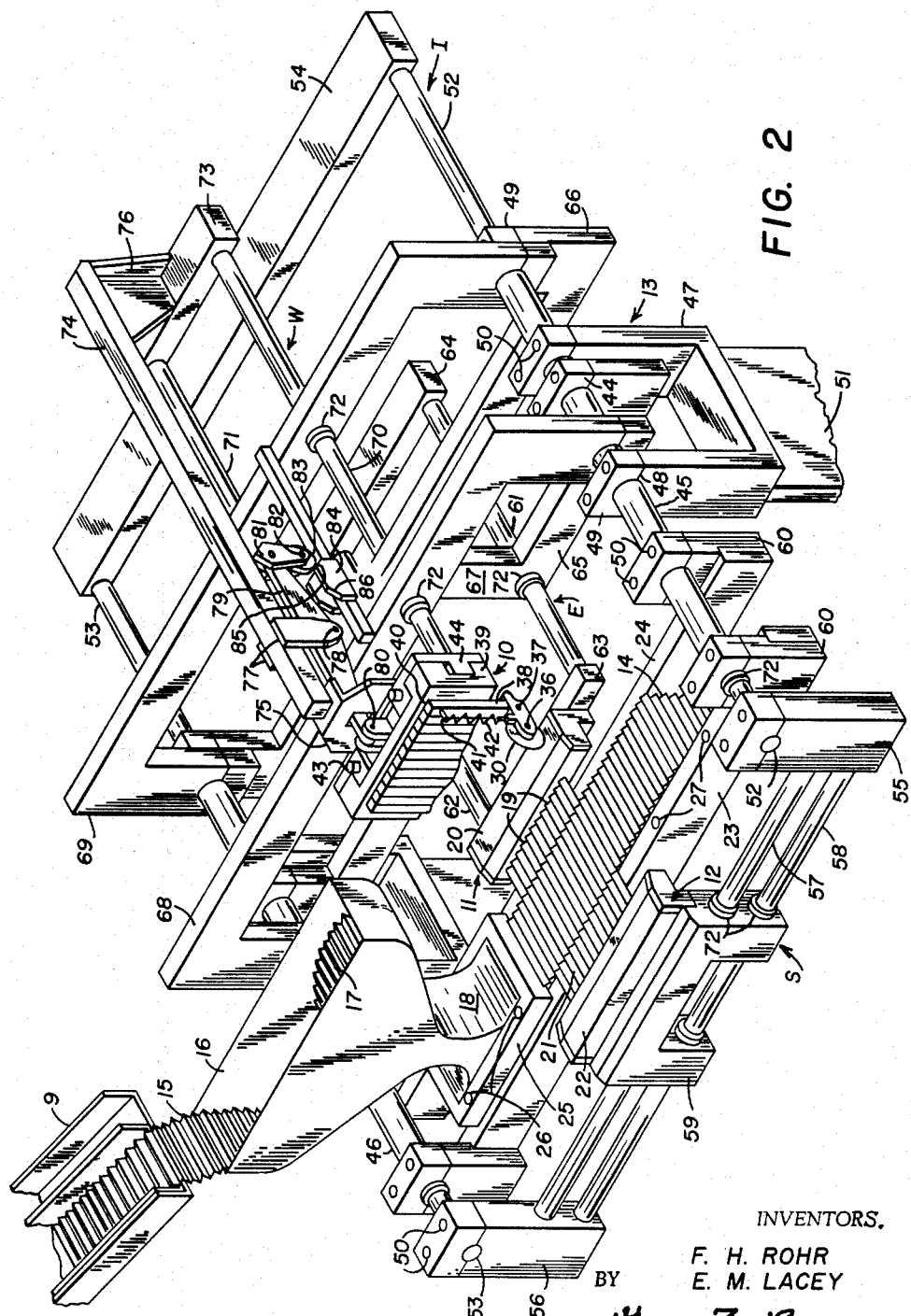
FIG. 2 is an isometric view of a framework which, taken with the components of the welding system, embodies the basic inventive concept of the present invention.
Figure 3:
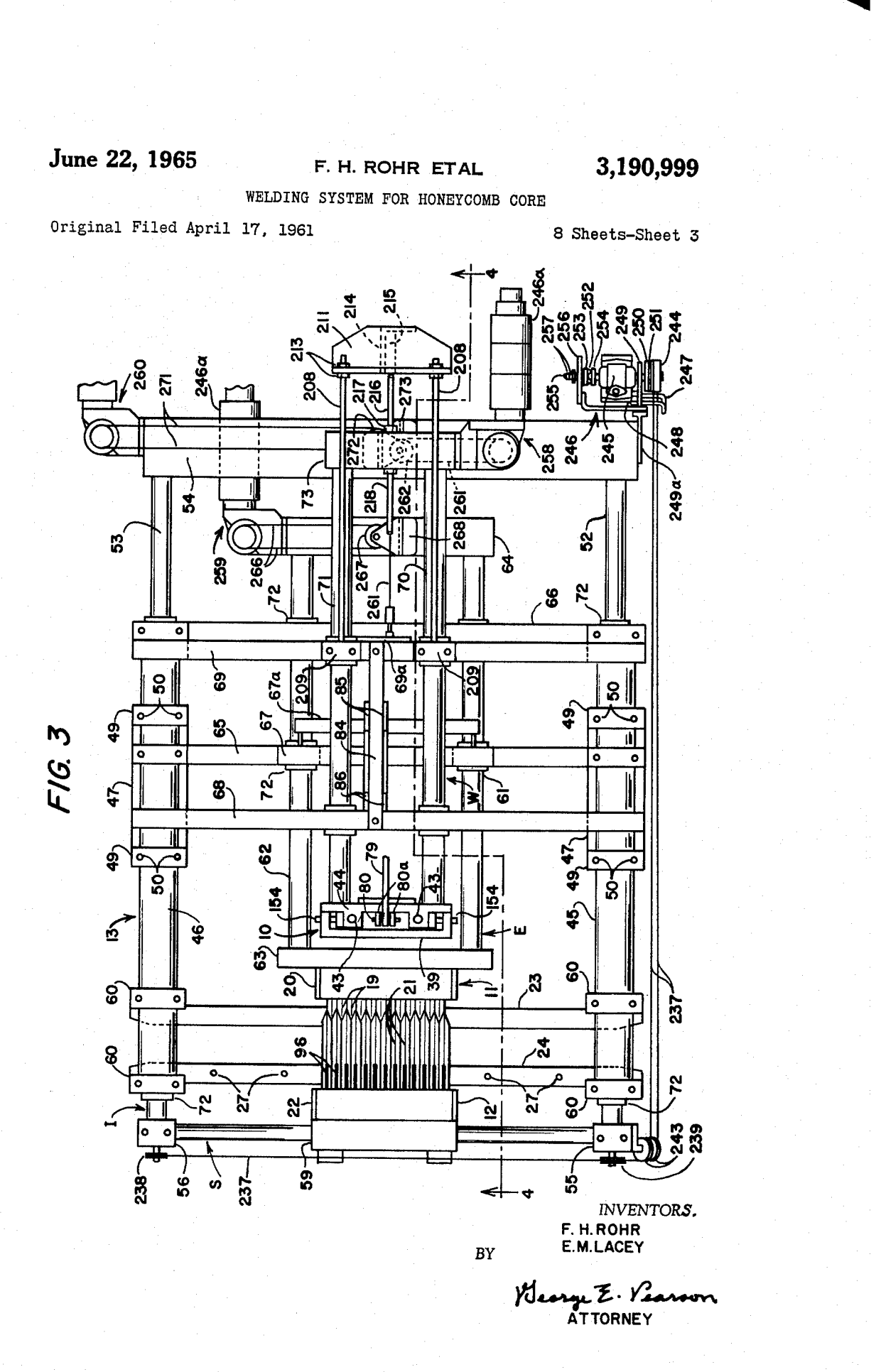

Referring now to the drawings for a more complete understanding of the invention, and first more particularly to FIGS. 2 to 4, there is shown thereon a honeycomb core fabricating machine which is functionally equivalent to that disclosed and claimed in the aforesaid copending application of Fred H. Rohr, Serial Number 846,903, that is to say, both machines have the same basic components and the same basic movements. Thus, both machines comprise a welding wheel assembly or welding head generally designated 10, an electrode pin assembly 11, an indexing pin assembly 12, and a supporting framework generally designated 13.

A core in the process of fabrication on the machine is generally designated 14 and is built up from an endless corrugated ribbon 15 which is supplied from a source (not shown) such as the strip feed and corrugating apparatus disclosed and claimed in the copending application of Elbert M. Lacey, Jr., for Method and Apparatus for Feeding Metal Strips, Serial Number 78,720, filed December 27, 1960. The ribbon so supplied is received by way of a suitable chute or slide 9 and a wine glass shaped feed control device 16 which forms a hopper in its upper portion into which the ribbon 15 may fall into one or more loops such as indicated at 17. Feed control device 16 also has a narrowed throat portion 18 providing a restricted opening which approximates the thickness of the corrugated ribbon, that is to say, the dimension corresponding to the depth of a trough or the height of a crest, as the case may be. The restricted opening serves to keep the ribbon supplied to the core under sufficient tension, short of stretching and deforming the same, such that the ribbon nodes fall naturally into alignment with the confronting nodes of the previously formed core layer. On leaving the throat 18, the ribbon is fed and guided outwardly of the device 16 through the open bottom thereof in either direction longitudinally of the core and into what becomes the upper layer of the core as the same is shuttled in either direction to the right or to the left of the machine.

The electrode pins 19 move axially into and out of what constitutes the upper row of completed cells of the core 14, and the indexing pins 21 move axially into or out of what constitutes those cells which are being newly added to the core upon welding of the ribbon 15 thereto.

Electrode pins 19 which in the specific case, as shown, may be 12 in number, are precisely formed and precisely mounted and spaced in a header member 20 to which they are suitably secured as by being potted in a body of suitable plastic such as an epoxy resin molded within the member 20. When so formed, the electrode fingers or pins 19 closely fit the cell configuration, as may be seen in FIG. 1, but may be freely moved axially thereof into or out of the cells of the core 14. Indexing pins 21 are similarly formed and precisely spaced and mounted in a header member 22 comprising the indexing pin assembly 12.

Electrode pins 19 lie generally within the plane of the cells of the core 14 formed by the previous welding thereto of a length of ribbon 15 extending along the length of the core. The indexing pins 21 are disposed in internesting relationship with the electrode pins 19 and are disposed generally in a plane spaced one-half cell width above the plane common to the electrode pins. As otherwise expressed, the indexing pins are disposed generally in a plane of those cells which are being newly added to the core to form the upper layer of cells thereof.

Both the electrode and indexing pins are mounted for movement axially thereof into and out of the cells of the core, and the electrode pins when so inserted into the core, are in supporting relation with respect thereto, the core being depended from these pins and supported, at least in part, therefrom. The indexing pins 21, on the other hand, when inserted into position on the core, are disposed beneath a section of the corrugated ribbon 15 which is to be welded to the core and, consequently, do not initially provide a support function for the core. When the welding of this ribbon section has been completed and the same is secured to the core, and when the electrode pins have been withdrawn axially from the core, the core is then supported by the indexing pins so that the core may be shuttled by movement of the indexing pin assembly 12 to the right or to the left, as the case may be.

With the parts in the positions as shown in FIG. 2, the machine is so set up that upon being set in operation, the core 14 would be shuttled in successive increments of 12 cells each to the right. Assuming, for example, that the welding wheel assembly 10 has just returned from a sweep across the ribbon section disposed above the pins 19 and 21 so that this ribbon section has been welded to the core, the electrode pins 19 are then withdrawn from the core, or may have been withdrawn from the core upon the return sweep movement of the welding wheel assembly 10. On removal of the electrode pins 19 from the core, the same is supported by the indexing pins 21 and may be shuttled to the right as a unit with the indexing pin assembly 12. On shuttling the core, an additional length or section of ribbon 15 is withdrawn from the feed control device 16 and assumes a position of alignment with the confronting nodes of the corresponding section of the upper ribbon of the core. The electrode pins are then reinserted into the core beneath the last mentioned ribbon section, following which the indexing pins are withdrawn axially from the core and the assembly 12 returned to the area of the welding station. The indexing pins are then inserted beneath the newly superimposed section of ribbon 15 which is to be welded to the core in the next cycle of operation of the welding machine.

When the core has been shuttled completely to the right so that the last core section of increment of cells at the extreme left end of the core have been formed at the welding station, both sets of electrode and indexing pins 19 and 21 are withdrawn axially from the core and the core is lowered by one-half cell width following which the pins are again inserted into the confronting cells of the core. The wine glass control device 16 is then moved from the position shown to the right side of pins 19 and 21 into a position comparable to that disclosed on the left side of the pins, that is to say, device 16 will be similarly supported on stripper bars 23 and 24 between which the core 14 builds up layer by layer as the same is lowered one-half cell width at a time from the pins 19 and 21. The base 25 of device 16 carries a pair of spaced dowel pins 26 which are adapted to be received in openings 27 in stripper bar 23 to assure proper positioning of the device 16 on the stripper bars on either side of the pins 19 and 21.

As the device 16 is moved to the right side of the pin assemblies, an additional length of the ribbon 15 is withdrawn therefrom and doubled back over that portion which has just previously been welded to the core, and this new section of ribbon falls naturally into alignment therewith, node for node, as aforedescribed. The machine is then in position for shuttling of the core by increments to the left to add the next layer of cells to the core. When this layer has been completed, the extreme right end section of the core is positioned at the welding station and the core is again lowered one-half cell width and feed control device 16 returned to the left side of the pins 19 and 21, as shown, to thus complete an overall cycle of operations of the machine.

This overall cycle thus, by way of review, includes shuttling of the core in one direction over the length thereof to complete one row of cells of the core followed by shuttling of the core in the reverse direction and over the length thereof to form a second row of cells of the core. The core so fabricated, may be made to any desired length and may be built up row-by-row to any width within the space limitations of the environmental surroundings of the machine. When desired, moreover, the machine may be shuttled continuously in either direction and the core returned upon itself to form an endless belt.

Figure 1:
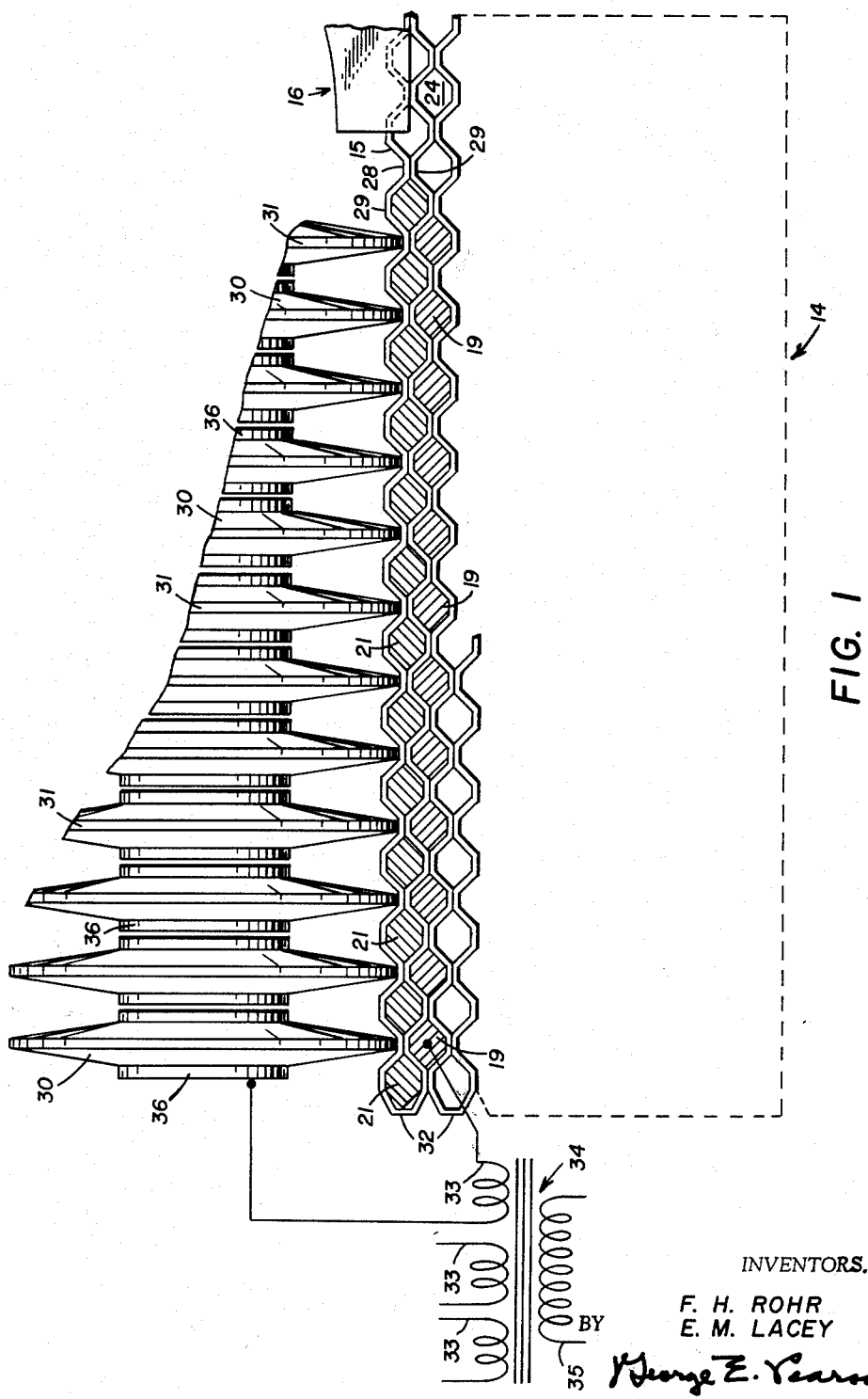
FIG. 1 is a fragmentary view, somewhat enlarged, of a honeycomb core in the process of being welded.

Referring now more particularly to FIG. 1, it may be seen that the corrugated ribbon 15 has flattened troughs 28 and crests 29 which form aligned and abutting nodes 28, 29 of adjacently disposed and oppositely corrugated ribbon sections. As otherwise expressed, these adjacent and oppositely corrugated ribbon sections are displaced relative to each other by one half the spacing between corrugations, or by one half the length of a cell as measured longitudinally of the core, with the result that the crests of one section are aligned and abutted with the troughs of the other. Upon welding together of these abutting nodes, generally diamond-shape cells of square configuration are formed, but for the flattened crests and troughs which tend to give the cells a hexagonal configuration.

The aligned and abutting nodes 28, 29 to be welded are juxtaposed and supported on the electrode pins 19 whose upper surfaces are appropriately matched to conform with the under surfaces of the crests 29. The upper surfaces of the adjoining troughs 28 are electrically engaged by the welding wheels 30 whose peripheral rim portions provide an engaging surface area 31 whose width may be of the order of ¼ the nodal width. Thus, in a specific case, the wheel rim perimeter 31 may be .010 inch wide and the nodal width approximately 0.04 inch. This allows for limited wandering or deviation of the wheels 30 from the intended welding swath to be laid down thereby when the welding current passes between the wheels and electrodes as the wheels sweep along the aligned and abutting nodes and across the adjacent ribbon sections to be welded together.

In order to hold the welding swath or track along the nodes substantially within the allotted dimensional width, the wheels must be precision formed and rotatively mounted, and the alignment of the abutting nodes likewise must be precisely arranged. This, in turn, requires that the spacing between pins, both indexing and electrode, be accurately established and maintained repetitively in the course of the several pin and wheel movements which must take place with each cycle of operation of the machine.

The electrode pins, as aforenoted, serve to align the crests 29, but it is one of the functions of the internesting indexing pins to assure that the abutting troughs 28 are properly aligned and juxtaposed therewith and this, in turn, assures that subsequently, the electrode pins will be properly received into the cells previously formed about the indexing pins.

The core so formed from cell to cell and layer to layer comprises an integral length, or spliced continuous length of ribbon 15 which, as aforedescribed, is doubled back upon itself at each end of the core as indicated at 32, as each new layer of cells is to be added to the core. When so doubled back over the indexing pins 21, as shown in niternesting relation with respect to the electrode pins 19 in FIG. 1, the precision forming of the corrugations in the ribbon 16 and the precision forming and spacing of the internesting pins combine to assure that the abutting nodes will juxtapose and align relative to each other and with respect to the electrode pins. The end result is high quality core of uniform and consistent cellular configuration and of virtually limitless length and breadth.

The uniformity and consistency of the welds also contribute to the quality and strength of the core and this, again, depends on the extent to which the internesting pins effect the desired alignment, abutment and general juxtaposition of the nodes with respect to the electrode pins. The tracking and pressure of the welding wheels are further factors contributing to the achievement of satisfactory welds, as are the parameters of the welding circuit and system as hereinafter more fully described.

It suffices to state with reference to FIG. 1 that the electrode pins 19 are formed of highly conductive material and precisely spaced and embedded in plastic insulation in the head 20, these pins therefore being insulated from each other. Each pin 19 is separately brought out and connected to a transformer secondary winding 33, the other terminal of which is connected to the support 36 for the coacting electrode wheel 30, as indicated schematically in FIG. 1. The indexing pins are similarly embedded in head 22 and thus precision spaced and electrically insulated but need not be so insulated or formed of highly conducting material since they have no electrical function, the indexing pins preferably being formed of cold rolled steel.

Each electrode pin 19 and its associated coating electrode wheel 30 are thus connected in circuits individual thereto in series with a seconudary transformer winding 33. In the specific disclosure of 12 welding wheels and 12 electrode pins there preferably are employed 4 transformers such as the transformer 34 disclosed which has a primary winding 35 and 3 secondary windings 33. By reason of this arrangement, the welds laid down by each wheel are rendered independent of any circuit variations such as may be experienced by the circuits individual to the other wheels. In prior art arrangements wherein the wheels may be connected in series or in parallel arrangements, variations in the node contact pressures or wheel contact pressures produce variations in the resistance of the welding current paths with the result that an unfavorable weld condition experienced by one of the number of series connected wheels may lessen the welding current and prevent satisfactory welds by the others or, in the case of parallel connected wheels, the welding current due to a burning through or shorting of one of the wheels may reduce the current to others below that required for satisfactory welds.

Referring now more particularly to FIGS. 6 to 10, it will be seen that the electrode pins 19 and indexing pins 21 are formed and shaped identically. As best seen in FIG. 10, the pins are formed from square stock, the upper corner of which is removed to provide a top surface 90 which precisely fits the under surface of a node 29 (FIG. 1), of the corrugated ribbon 15. Similarly, the upper diagonally directed surfaces 91 precisely fit the diagonally directed undersides of the ribbon adjacent the node 29. Surfaces 91, however, are undercut as at 92 to provide longitudinal grooves for receiving protrusions in the ribbon when the same is perforated, as at the time of forming the corrugations in the ribbon. The lower corner of the square stock is removed to a greater extent than in the case of the upper corner with the result that the lower surface 93 is wider than the upper surface 90, and clearance grooves 94, similarly formed in the lower diagonal surfaces 95, terminate in the surface 93. The remaining portions of surfaces 95 precisely fit the adjacent cell walls to thus assure precise forming of the cells but the material removed in forming bottom surface 93 and grooves 94 provides clearance between the pin and the lower walls of the associated cell. This clearance not only assures freedom of movement of the pins wthin the cells, and particularly with respect to perforation protrusions which are directed alternately upwardly and downwardly as the ribbon is doubled back and forth upon itself, but the clearance also permits use of ribbon which may be varied in thickness, as required, to provide various strength patterns in the fabricated core.

A ribbon stop 96 is undercut to fit the upper surface of the pins as disclosed in FIG. 10, one of these stops being used for each indexing pin 21 to which it is secured as by rivets 97. As may best be seen in FIG. 9, ribbon stops 96 are so positioned on the indexing pins so that one end of a stop extends into the potting resin 22a which fills the recess 98 in the header member 22 for holding the indexing pins 21. The ribbon stops have sufficient length along the indexing pins such that the opposite ends of the stops lie flush with the inner face of stripper bar 24, as indicated by the dashed line in FIG. 6. As will appear more fully as the description proceeds, an adjustment of the support frame for the indexing pins is provided to assure that the ribbon stops are thus properly aligned with stripper bar 24.

Each of the electrode and indexing pins is reduced in diameter as at 99. This has no utility in the case of the indexing pins, but in the case of the electrode pins, serves to receive a ferrule 100 which, in turn, has a conductor cable 101 secured thereto. Ferrule 100 is secured, as by brazing, to the electrode pin, and a suitable tube of insulation 102 preferably covers conductor 101 and extends over the exposed end of the ferrule. Potting plastic 20a for retaining the electrode pins fills recess 98 in the header member 20 for holding electrode pins 19 and has a rearwardly extending portion 20b which serves to insulate and support the cable ferrules 100.

Each of the electrode and indexing pins is tapered to a point 103 in order to assure free entry of the pins into the cells of the core, and the tips of the electrode pins are chrome plated, as indicated at 104 to avoid premature wear of the soft copper pins as the same move against the knife edge thin edges of the relatively hard stainless steel ribbons.

As may be seen in the drawings, the electrode and indexing pin holders 20 and 22 per se are identical and each has spaced openings 105 to receive suitable bolts, screws, or like fasteners, such as fasteners 106 (FIG. 5), to secure the holders to their respective supports 63 and 59 respectively.

The internesting electrode and indexing pins 19 and 21, when inserted within the cells of the core, lie over the spaced stripper bars 23 and 24 and bridge the same, as best seen in FIG. 6. The bars 23 and 24 are notched as indicated at 107 (FIGS. 5 and 6) to receive the electrode pins and support the same in mutually spaced relation. Although the electrode fingers thus contact the steel stripper bars, the low resistance of the fingers constitutes a preferential path for the welding current through the fingers. The indexing pins 21 lie above the electrode pins in internesting relation therewith, but lie above the stripper bars and clear the same to thus permit the indexing fingers to shuttle longitudinally of the bars. Thus, the core, which occupies the space between the dashed lines (FIG. 6), is freely shuttled longitudinally of the bars by the indexing fingers disposed within the cells of the core, the electrode pins, of course, being withdrawn from the core at the time of the shuttling movement.

Referring now more particularly to FIGS. 15 to 18, it will be seen that each of the wheels 30 is rotatively mounted on a pivoted member 36 which, in turn, is pivotally connected as by the countersunk screw 37 to a vertically disposed member 38 to which the transformer lead may be connected. The wheels 30 and their supports 36, however, are formed on highly conductive metal such as copper whereas the member 38 preferably is formed of the less conductive steel. It is preferred therefore that the transformer lead or cable 108 be secured, as by brazing, directly to the copper member 36 which, for this purpose, has a terminal portion 109 to which the cable is connected.

Each wheel 30 is secured to its support member 36 by means of a countersunk screw 110, which in the manner of mounting of screw 37, has a countersunk opening 111 provided therefore in member 36. The wheel has a large central opening 112 which receives the shoulder or hub 113 of a steel washer-shaped nut 114 upon which the wheel is journalled for rotation. The inner face 115 of nut 114 is recessed at 116 which thus reduces the area of the bearing surface afforded by face 115 in sliding engagement with the hub face 117 of the wheel. The diameter of bearing face 115, however, is significantly large and serves to prevent wobble of the wheel on the hub bearing surface 113 when the opposite hub surface 118 of the wheel is moved against the inner surface 119 of member 36, as by tightening screw 110 into the threaded opening 120 provided therefor in nut 114. Face 119 is also recessed as at 121 to reduce the bearing area of the wheel on face 119, particularly in view of these surfaces both being copper. The area of contactor electrical engagement of surfaces 118 and 119 is ample, however, to optimally pass the welding current between the wheel and support member 36, and the anti-wobble bearing arrangement assures electrical circuit continuity between these parts.

As may best be seen in FIGS. 17 and 18, the lower end 122 of member 38 is reduced in thickness and is shaped similarly to the hub portion of wheel 30, having a central opening 123 for receiving the hub 113 of a nut 114, and having opposite faces 124 and 125 for respectively engaging faces 115 of nut 114 and face 119 of member 36. A recess 126, concentric with the axis of hub 113 and screw 37, is provided to reduce the bearing area of face 119 of member 36 in engagement with face 125 of portion 122 of member 38, and the reduced face 115 of nut 114 similarly provides a limited bearing area in engagement with face 124 of member 38. Screw 37, as in the case of screw 110, engages its associated nut 114 to move these bearing surfaces into face adjacency.

Referring now more particularly to FIGS. 15 and 17, each member 38 carries a threaded pin 41 which is threaded therein and locked thereto by a nut 127. Pin 41 terminates in a bifurcated member 128 which, in turn, carries an adjustment screw 129 against which a compression spring assembly 42 is urged, the other end of this assembly being urged against wheel pivot member 36 with the result that wheel 30 is urged by its spring assembly to move in a downwardly direction.

This downward movement of the wheel is limited and adjustable by a second threaded pin 130 which is threadedly received in member 38, locked thereon as by a nut 127, and passed therethrough to engage a stop 131 in the form of an angularly bent upstanding portion of member 36.

A second angularly bent upstanding portion 132 of member 36 has a recess 133 formed therein which serves to seat the tip of the tapered pin 134. Pin 134 is enlarged as at 135 and 136 to provide a seat for compression spring 137 of the spring assembly 42. The other end of spring 137 is similarly seated on shoulders 138 and 139 formed on a tapered pin 140 which seats in the cupped end of adjustment screw 129. The shank 141 of pin 140 is drilled out as at 142 to slidably receive the shank of pin 134 therewithin to thus make provision for pivotal movement of member 36 about the axis of screw 37 while retaining the spring assembly 42 in compressive engagement with screw 129 and seat 133.

Adjustment of stop screw 130, as aforedescribed, limits the downward pivotal movement of wheel 30 and its support 32, and adjustment of screw 129 determines the extent of initial compression of spring 137 in urging the member against the stop screw 130. The contact pressure with which each wheel 30 engages the ribbon nodes to be welded as the wheel moves yieldably thereagainst may thus be accurately predetermined and preset, working directly with the wheel sub-assembly unit as disclosed in FIG. 15.

Elongated clearance openings 143 are provided in each member 38 to receive suitable fasteners 144 (FIGS. 11 to 14) for securing the same to an adapter plate 145 and intermediate sheet 40 of insulation material such as micarta. The heads of screws 144 actually engage retainer pieces 146 having insulation pieces 147 which, in turn, engage members 38 and bridge the elongated openings 143 therein. Screws 144 which clear the openings 143 may thus be tightened to clamp members 38 together as a unit in adjusted positions on adapter plate 145 without connecting the same electrically together through the adapter plate.

Figure 13:
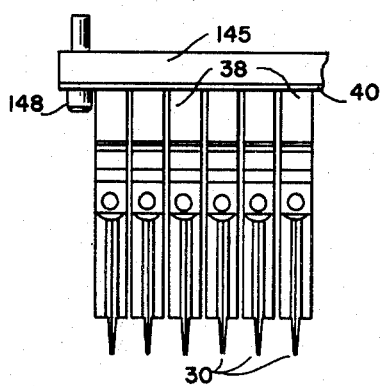
FIGS. 13 and 14 are top fragmentary views of wheel assemblies showing alternative wheel spacing arrangements.
Figure 14:
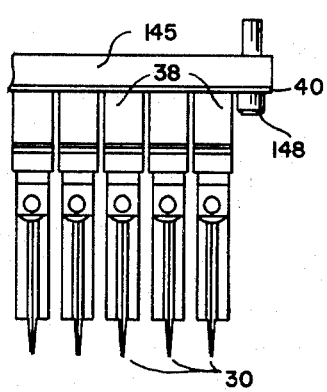

It will be understood that the wheel sub-assemblies will be made in different sizes in accordance with the various cell sizes of honeycomb core to be fabricated and, accordingly, the parts may be smaller, note the reduced thickness of parts 38 in FIG. 13 as compared to the same parts as in FIG. 14, and the wheel sub-assemblies may be closely or widely spaced on the adapter plate. In FIG. 13, for example, a large number of thin, closely spaced wheel assemblies, spaced in accordance with the spacing between cells of the core to be fabricated, are employed in an arrangement in which welding is to occur in only one direction of sweep of the wheels over the abutting ribbon nodes. In FIG. 14, by way of contrast, the parts are larger and the spacing between the wheel sub-assemblies is greater, the arrangement being one in which welding is to occur on both passes of the wheels back and forth across the abutting ribbon nodes, the wheels, however, being shifted laterally by one cell width, after passing across alternately spaced nodes, in order to weld the intermediate nodes on the return stroke of the wheels.

The adapter plate 145 is secured as by four screws 148 to a movable support member 39 (FIG. 19) which, for this purpose, has four threaded openings 149. Member 39 is mounted on a fixed head member 44 for raising and lowering movements, and also for side to side movements, of the welding wheels with respect thereto, these movements being accomplished by means of an interfitting centrally disposed member 150. To this end, member 39 has rearwardly extending upper and lower ears 151 and 152, respectively, which ears have longitudinally extending openings 153 for receiving pins 154, in turn, receivable in apertures formed therefor in upstanding and depending ears 155 and 156, respectively, on member 150. In assembling members 39 and 150, the same are first moved together with pins 154 being removed. Once assembled, the pins are inserted thru the openings 153 and inserted as with a press fit within the openings in ears 155 and 156, or by threaded engagement therewith.

The upper and lower surfaces of member 150 similarly carry upstanding and depending pins 43 which are secured thereto after first being passed through openings 158 provided therefor in forwardly extending ears 159 and 160 on member 44. This is done, of course, when members 44 and 150 have first been fit together such that their pin receiving openings are aligned.

Figures 11, 12:
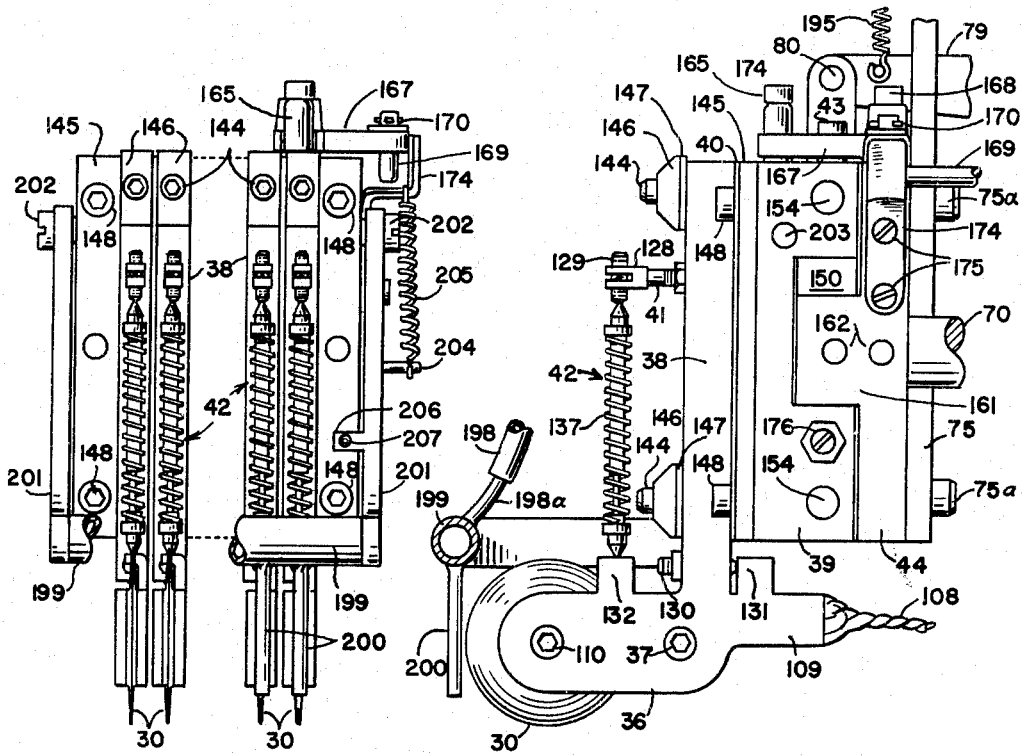
FIG. 11 is an enlarged side elevation of the wheel assembly disclosed in FIG. 4, certain parts being broken away to disclose features of construction and arrangement of parts.
FIG. 12 is a front view of the wheel assembly disclosed in FIG. 11.

When members 39, 150 and 44 have been assembled, as aforedescribed, member 39 and the wheel sub-assemblies supported thereon may be shifted laterally and slidably along pins 154 and relative to members 150 and 44 which are constrained to vertical movement relative to each other slidably along pins 43. This lateral movement is effected as an incident of the movement of the members 39, 150 and 44 as a unit, namely, welding head 10, as the same moves to forward and return end limit positions axially of the unit support rods 70 and 71 which are suitably secured to fixed member 44 and bosses 161 thereon, as by fasteners 162 (FIG. 11). Members 39 and 150 have openings 163 and 164 for freely receiving these bosses, as best appears in FIGS. 11 and 19.

To effect the lateral shift, member 39 carries an upstanding pin 165 which is adapted to be received in the bifurcated end 166 of a bell crank 167 which is pivotally mounted on member 44 by means of a pin 168. The other end of the bell crank has an opening to receive the upturned end of a long rod 169, the same being secured therewithin by a cotter pin 170. Rod 169 also freely passes through an apertured bracket 171 which is suitably secured as at 157 to frame member 68.

Collars 172 and 173 are secured to rod 169 fore and aft of bracket 171 and spaced with respect thereto such that, as the welding head 10 and welding carriage frame, generally designated W, move forward, rear collar 173 is ultimately stopped by bracket 171, and this causes bell crank 167 to be pivoted counter clockwise about pin 168 as the forward movement is completed thereby causing member 39 and the wheel sub-assemblies supported thereon to be shifted to the right as viewed in FIG. 19. On the return trip, collar 172 is stopped by the bracket, the bell crank pivots clockwise, and the shift of member 39 and the wheels is then to the left, thereby completing the shifting cycle.

An offset leaf spring 174 suitably secured to member 44 as at 175 engages the rod-coupled end of bell crank 167 such that it moves with a snap action into the two shift positions provided, these being determined and set precisely by adjusting screws 176 (one only being shown) which are provided at each end of member 39. These screws extend thru ears 152 for engagement, respectively, by the ears 156 of member 150.

When the lateral shift of the wheels is not required, as when the welding is accomplished entirely on the forward pass of the wheels, the collars 172 and 173 are simply spaced a greater distance from bracket 171 such that bell crank 167 is not activated by movement of welding carriage W.

Member 150 has a bifurcated bracket 80a secured thereto (FIG. 19) as by suitable fasteners 175 and provides a pair of spaced upstanding lugs having aligned openings 177 for receiving a pivot pin 80 (FIG. 2). By this means wheels 30, their adapter plate 145 and members 39 and 150 may thus be lowered relative to the fixed plate 44 to bring the wheels into engagement with the abutting nodes, and further lowering movement of the member 39 after the wheel engagement is thus established, causes predetermined compression of the spring assembly 42 to thus provide a required contact pressure of the wheels on the associated nodes.

The success of the welding operations and the quality of the fabricated core depend in large measure upon the precision with which the welding head 10 and the electrode pin and indexing pin assemblies 11 and 12 may be moved repetitively to engage the ribbon and core and to shuttle the core following the welding of each series of aligned and abutting nodes. The precision with which these movements may be executed depends, in part, on the motor drive system hereinafter generally disclosed and which constitutes the claimed subject matter of a copending application for Drive System for Honeycomb Core Machine, Serial Number 207,162 filed June 29, 1962, to which reference may be had for further details of operation and construction. The precision of these movements also depends upon the framework support for the assemblies 10, 11, and 12. This framework 13 comprises a main frame and several subframes presently to be described, as may best be seen by reference to FIGS. 2 to 4.

The main frame comprises two basic structural members in the form of a pair of spaced parallel tubes 45 and 46 the inherent rigidity and torsional strength of which provides basic support for the other structural members of the machine, and by reason of the telescopic nature of the tubes serves to slidably support the subframe designated I upon which the indexing fingers 21 are mounted for axial movement, as will presently appear. The structure for supporting the tubes 45 and 46 with respect to a support surface such as a table top or floor surface may comprise a base member 8 and one or more uprights 51 (FIG. 4) which support the transformers 34. The uprights support a pair of U members 47 the spaced legs of which provide space support for the tubes, there being one such U member for each of the tubes. The extremity of each leg of U members 47 is apertured to receive its engaging tube and each leg is severed along a diameter of the tube as indicated at 48 to provide complementary gripping surfaces to clamp the leg to the tube, the severed extremity 49, for this purpose, being secured to the main leg portion as by suitable threaded fasteners 50. This manner of clamping various structural members to the tubes and to like members of circular cross section is employed throughout the several parts of the framework and, accordingly, this clamping feature will not again be described in detail.

Slidably supported within tubes 45 and 46 are a pair of elongated rods 52, and 53 respectively which extend beyond either end of the tubes. At the rear end of the tubes, rods 52 and 53 are interconnected by a cross member 54 which has openings for receiving the rods interfittingly therewith and has substantial width axially of the rods so as to effect a rigid rectangular subframe therewith, hereinbefore generally designated I. This rigid rectangular subframe is completed at the forward extended ends of rods 52 and 53 by a second rigid rectangular frame designated S and comprising a pair of depending members 55 and 56 which are respectively clamped to the ends of rods 52 and 53. These depending members, in turn, are rigidly interconnected as by fasteners 178 to a pair of spaced parallel rods 57 and 58, FIG. 5.

Slidably supported on rods 57 and 58 is an inverted U member 59 whose legs are suitably apertured to slidably receive the rods. The base of slide 59 is slidably formed to provide for interfitting engagement with indexing pin head 22 to which it is preferably secured detachably, as aforedescribed (FIG. 5). The spacing between tubes 45 and 46 and rods 52 and 53 is such that slide member 59 and the indexing pins and head supported thereon may be moved fully to either side of the electrode pins when the same have been withdrawn axially from the indexing pins, thereby to shuttle the core 14 by an increment of 12 newly formed cells of the core. This shuttling space to the left of the machine, with the parts in position as shown in FIG. 2, is occupied by the ribbon feed control device 16 and, accordingly, the shuttling of the core, as shown, occurs to the right of the machine. When the indexing head 12 has been moved into this shuttling space on the right of the machine, the subframes I and S are readily moved as a unit forwardly of the machine by reason of the free sliding movement of the rods 52 and 53 in the spaced parallel tubes 45 and 46. This movement of these subframes causes axial withdrawal of the indexing pins 21 from the core, and the indexing head and its slide support 59 may then be slidably moved along rods 57 and 58 to restore the indexing head to the welding station at which time the subframes I and S may be moved as a unit rearwardly of the machine for re-engagement of the indexing pins with the core and internesting engagement with the electrode pins 19.

Each of the stripper bars 23 and 24 at each end thereof, has secured thereto and extended upwardly therefrom a member 60, the upper end of which is formed as heretofore described for clamping engagement with the associated tube 45 and 46, as the case may be. This clamping arrangement readily permits of adjustment of the stripper bars 23 and 24 axially of the tubes 45 and 46 to thus accommodate between the stripper bars variable core thicknesses within limits imposed by the over lapping length of the indexing and elecrode pins. It will be understood, moreover, that indexing and electrode heads 11 and 12 having different finger lengths may be installed on the machine to thus provide for variable core thicknesses, as measured in terms of the width dimension of the ribbon 15, of the order of upwards of 5 inches.

Referring now particularly to FIG. 4, it will be seen that a pair of members 179 and 180 secured respectively at both sides of the machine to the ends of stripper bars 23 and 24, and to their associated support members 60, have angularly bent portions 181 and 182 which serve to support a pair of elongated longitudinally extending bars 183 and 184. These bars, like stripper bars 23 and 24, define a vertical channel through which the fabricated core builds up row by row of the cells of the core.

Members 185 and 186 are secured respectively to bars 183 and 184 and depend therefrom and terminate in longitudinally extending bars 187 and 18. A core support 189, such as a block of plywood, is disposed beneath the core 14 during fabrication of the first several rows of cells and is perforated in simulation of the spacing between cells to receive pins 190 which bridge the bars 187 and 188 and slide therealong as the core is shuttled from side to side. When the core has been built up sufficiently to clear the bars 183 and 184, the same may be used to support the pins 190, the board or support 189 then being removed from the machine. Pins 190 in any event provide support for the core as the same extends beyond the ends of stripper bars 23 and 24 to either side of the machine, and provide the entire support for the core as when both electrode and indexing pins 19 and 21 are withdrawn therefrom.

Support 189 alternatively may be fabricated from a light weight metal member of T cross section to which spaced sheet members 191 are secured, substantially as shown.

In the manner heretofore described for the indexing pin subframe I, there is provided a similar subframe designated E for the electrode pins 19. Subframe E thus similarly comprises a pair of spaced rods 61 and 62 which, at their forward ends, are interconnected by a cross member 63 to which they are rigidly secured in any suitable manner. Cross member 63 serves to support the electrode pin head 20 to which it is secured preferably detachably by suitable fastener means (not shown) but utilizing mounting holes 105 in holder 20, as aforedescribed. The other end of rods 61 and 62 are interconnected by a cross member 64 to which they are rigidly secured, cross member 64 being generally similar, and its manner of attachment to rods 61 and 62 being generally similar to the construction and arrangement heretofore described in connection with cross member 54 of subframe I.

Subframe E is mounted for free sliding movement and axial movement of the electrode pins 19 parallel to the axes of tubes 45 and 46 by means of a pair of spaced parallel cross members 65 and 66 which interconnect the tubes and are clamped at the ends thereof to the tubes, the clamping arrangement being as heretofore described in connection with main frame support member 47. Rods 61 and 62 are mounted for free sliding support in openings suitably provided therefor in cross members 65 and 66, these openings being aligned such that rods in their sliding movements move parallel to the axes of tubes 45 and 46.

Cross members 65 and 66 are generally C shaped and generally depend from the spaced tubes 45 and 46. Cross member 65, however, in that central portion 67 thereof extending between spaced parallel rods 61 and 62 is directed upwardly to provide a clearance space for electrical cables 101 and 108 which individually connect to and terminate at the electrode pins 19 and wheel sub-assemblies respectively. A support 67a for these cables conveniently is secured, as shown (FIGS. 3 and 4) to upstanding portions of cross member 65.

An additional pair of generally C shaped spaced parallel cross members 68 and 69 interconnect tubes 45 and 46 and are clamped thereto as heretofore described.

These C shaped cross members are directed upwardly relative to the tubes and provide the sliding support for the welding rectangular subframe W which, in a manner similar to the other subframes, comprises a pair of spaced parallel rods 70 and 71 which are mounted for sliding movement parallel to the axes of the tubes 45 and 46. The rear end of rods 70 and 71 are interconnected by a cross member 73 to which they are rigidly secured, and the forward ends of these rods have the fixed welding head member 44 secured thereto, as aforedescribed. By reason of this sliding movement for welding subframe W, the same is constrained to move parallel to the axes of tubes 45 and 46 to thus assure that the wheels 30 are directed with precision along and parallel to the aligned and abutting nodes juxtaposed upon the electrode pins 19.

Welding subframe W provides support for a longitudinally extended member 74 which is secured in elevated position above this subframe by means of fore and aft members 75 and 76 which are secured respectively to head member 44 and cross member 73, this superstructure being removed in FIG. 3, and being disclosed in part in FIG. 11 wherein member 75 is disclosed as being secured to member 44 as by suitable fasteners 75a. A pair of vertically disposed members 77 depend from either side of member 74 to which they are secured and provide as at 78 a pivot support for a lever 79, the front end of which is pivotally secured as at 80 to the vertically movable portion 39 of the welding head, aforedescribed. The other end of lever head 79 has secured thereto on either side thereof a pair of vertically disposed depending members 81 which provide a pivotal support as at 82 for a cam follower wheel 83. Wheel 83 is mounted in cooperative relation to a cam 84 having rise and fall surfaces 85 and 86 which are spaced in accordance with the width of ribbon 15. Cam 84 is supported on cross members 68 and 69 to which it is suitably extended and interconnected, as may best be seen in FIG. 3. By reason of this arrangement, sliding movement of the welding subframe W to sweep the wheels across the ribbon also causes, by reason of the coaction between wheel follower 83 and cam 84, a downward movement of the vertically movable cam head portion 39 with the result that the wheels 30 first engage the aligned ribbon nodes and thereafter build up a desired contact pressure therewith as the spring assemblies 42 are compressed by further lowering movement of head member 39.

In the arrangement of the parts as disclosed in FIG. 4, the machine is set for welding only in the forward pass of wheels 30 over the core. To accomplish this, members 81 are mounted for pivotal movement about a pin 193 carried by lever 79, being yieldably biased to the upright position shown by a spring 192 which interconnects members 81 and member 74. A pin 194 carried by members 81 engages lever 79 to prevent counter clockwise movement of the members about pivot 193 when wheel 83 engages cam surface 85. Hence the wheel assembly is lowered as carriage W advances to move the welding head across the core. A coil spring 195 interconnecting lever 79 and member 74 raises the welding head as wheel 83 moves down the cam surface 86 at the end of the forward stroke. As the wheel engages cam surface 86 on the return stroke, members 81 are now free to move clockwise about pivot 193 as spring 192 is thereby tensioned. As a result, the welding head is not lowered on the return stroke.

When welding is desired on both the forward and return strokes of the welding head 10, members 81 are fixed to lever 79, this being accomplished by removing pin 194 and rotating members 81 counter clockwise until the same are aligned with lever 79 such that pin 194 may be reinserted to pass through an opening 196 therein. Members 81 being then locked to lever 79, engagement of wheel follower 83 with both cam surfaces 85 and 86 will cause lever 79 to tilt and thus lower the welding wheels.

It will be understood that additional cams like cam 84 which are similarly mounted cooperate as with a cam follower switch 197 which may serve to switch the welding current on and off as the wheels respectively engage and leave the abutting nodes. Similarly a second cam having several peaks may similarly be engaged by another cam follower switch to cause tack welding of the abutting nodes at spaced intervals therealong. Still another switch and cam arrangement may be similarly employed to direct cooling air to the wheels 30 during the passage of the welding current and to direct the air against the unwelded ribbon thereby to urge the same against the electrode pins preparatory to welding.

An arrangement for so directing the air is disclosed in FIGS. 11 and 12 wherein it may be seen that air from a source, not shown, is supplied by way of a flexible tube 198 to the inlet 198a to an air manifold in the form of a rigid tube 199. Depending from manifold tube 199 in spaced relation therealong is a plurality of air outlet tubes 200 from which the air passes in jets and strikes the ribbon to urge the same against the electrode pins. The air on being reflected from the ribbon strikes the wheels to cool the same, and to this end, the air is turned on before the welding wheels engage the ribbon and before the welding current is caused to flow.

Manifold tube 199 is secured at each end to an arm 201 which extends rearwardly and then upwardly to be secured as by a suitable fastener 202 to member 39, fasteners 202 being received in openings 203 on opposite sides of member 39. A pin 204 on one arm 201 mounts a coil spring 205 which is anchored on the other end thereof as on leaf spring 174. A lug 206 on this arm carries a stop screw 207 which engages adapter plate 145 to limit movement of air outlet tubes 200 toward the wheels under tension of spring 205.

The ease of the free sliding movement of subframes I, S, E, and W is greatly facilitated by the use of linear bearings 72 which are employed within tubes 45 and 46, on shuttle slide member 59, and on cross members 65, 66, 68, 69. Such linear bearings are well known and may be of any type suitable for the purposes such, for example, as those manufactured and sold by the Thompson Ball Bushing Company whose XA 122026 linear bearings are particularly well suited for the purpose.

Referring now to FIGS. 3 and 4, it will be seen that a first pair of spaced rods 208 extend rearwardly from cross frame member 69 to which they are secured, each by a fastener block 209. A second pair of rods 210, disposed below rods 208, extend rearwardly from cross frame member 66 to which they are suitably secured. These rods are secured respectively to upper and lower plates 211 and 212 having bent and apertured portions to receive the same whereby the plates are secured to the threaded ends of the rods as by the nuts 213.

Extending between plates 211 and 212 and suitably secured thereto as by welding is an angle member 214. Three extensions or lugs 215 from the fore-to-aft leg of angle 214 serve as stops for carriage frames W, I and E, these respectively appearing from top to bottom in FIG. 4. Upper stop lug 215 coacts with a stop pin 216 adjustably threaded to cross beam 73 and secured thereto by lock nut 217, to thus limit the rearward movement of welding frame W. A similar stop pin 218, similarly adjustably secured to the forward side of beam 73, limits the forward movement of welding carriage W as pin 218 moves to engage fixed cross beam 69.

Similarly, cross beam 64 of the electrode pin frame E carries stop pins 219 and 220 fore and aft of the beam which respectively engage beam 66 and bottom stop 215 as the electrode supporting frame E moves fore and aft to insert and withdraw the electrode pins 19 from the cells of the core.

In the same manner, cross beam 54 of the supporting frame I for the indexing pins carries stop pins 221 and 222 fore and aft of the beam, these pins respectively engaging a plate 69a (FIG. 4) which interconnects cross beams 66 and 69 and intermediate stop 215, to thus limit the fore and aft movements of frame I as the indexing pins are withdrawn from the core and reinserted therein, respectively. As aforementioned, ribbon stops 96 on indexing pins are aligned at the extended ends thereof with the inner face of stripper bar 24 and this is accomplished through adjustment of stop pin 222 on cross beam 54.

Referring again to FIG. 5, it will be seen that shuttle member 59 is limited in its movements on rods 57 and 58 by fixed set screws 223 which are secured respectively to members 55 and 56. In addition, a pair of floating stop pins 224 and 225 are provided for the right and left sides of the machine, each having a crank arm 226 which terminates in a ball 227. Pins 224 and 225 are mounted for sliding movement in tubes 229 and 230, respectively, which are secured as by welding to their associated members 55 and 56, these members having aligned openings through which the pins extend.

Each of tubes 229 and 230 are slotted longitudinally as at 231, and these slots terminate in a lateral slot 232, in order to accommodate movements of arms 226. Thus, arm 226 for pin 224, to reach the position shown in FIG. 5, would be moved to the left along slot 231, being extended at this time horizontally from tube 225 until slot 232 is reached. Arm 226 and ball 227 are then moved downward to the position shown to thus lock pin 224 in a position to limit movement of member 59 completely to the right. The shuttling movement of member 59 is then restricted to engagement with pin 224 in movements to the right and engagement with stop pin 223 in movements to the left.

When the shuttling direction of the core is to be reveresd, arm 226 for pin 224 is raised and moved to the right along slot 231, the pin then having a position as depicted for pin 225 in FIG. 5. With shuttling member 59 then positioned either in its center position or to the extreme right in contact with stop pin 223, pin 225 is moved to the right until its arm can be lowered into slot 232. This then places pin 225 into a position comparable to that depicted for pin 224 in FIG. 5, and this will then restrict further shuttling movement of member 59 to movements between pin 223 on the right and pin 225 on the left. The fine adjustments afforded by the set screws 223 and the like arrangement on the ends of pins 224 and 225 assures that member 59 and the indexing pins supported thereon will always be moved in exact increments corresponding to an integral multiple of the spacing between the cells.

Member 59 has mounted thereon, as by fasteners 233, a bracket 234 having forwardly extending apertured arms for receiving a pair of bolts 235 which are suitably secured thereto as by nuts, as shown. The ends of bolts 235 carry cable clamps 236, or the like, to which opposite ends of a single cable 237 are respectively secured in a well known manner. The cable from one clamp 236 passes over a pulley 238 mounted on member 56, and then passes over a second pulley 239. The cable from the other clamp 236 passes over a pulley 240 which, together with pulley 239, is mounted on a bracket 241, in turn, secured as by fasteners 242 to member 55. From pulleys 239 and 240, the cable is directed rearwardly over pulleys 243, also pivotally supported on bracket 241, to a drum 244 (FIG. 3) about which it is wound in threaded grooves and to which it is suitably secured.

Sheave or drum 244 is driven thru a gear box 245 by an electric motor 246a, these elements together comprising a unit generally designated 246 which may be of any type suitable for the purpose such, for example, as the actuator manufactured by Lear, Inc., of Grand Rapids, Mich.

The motor per se for such an actuator has a rated speed of the order of 20,000 r.p.m. and therefore incorporates a magnetic clutch to disengage the motor from the gear train in order to avoid over running due to the inertia of the motor armature. A brake is also incorporated which locks the gear train to the gear housing as the motor is disengaged from the gear train. Similarly, the brake releases the gear train as the motor is energized and establishes a driving connection with the gear train through the magnetic clutch.

It is a feature of the cable drive for shuttle member 59, however, that the same be moved into position against its stops before the drive motor is deenergized. This is accomplished by mounting the actuator unit for rotation yieldably about the axis of cable drum 244 and against the force of a U shaped torsion rod spring 247, one end of which is secured to the gear box housing at at 248 and the other end of which is secured to a mounting bracket 249, in turn, secured to cross beam 54 by bracket 249a. By reason of this arrangement, when the member 59 moves against one of its stops, further winding of the drum ceases as the cable tensions, and further rotation of the motor armature rotates the gear housing which has a pin arranged to engage the actuating button of one of two micro switches, now shown, depending on the direction of rotation of the gear case about the drum or actuator drive axis. A break-make switch combination in the micro switch thus actuated deenergizes the motor and the make portion of the switch combination serves as a sequence switch for initiating a followup function of the machine. Another sequence switch connected in series with the break portion of the other micro switch, when closed in the cycle of operations of the machine, will energize the motor for operation in the reverse direction until the gear box rotates sufficiently in the opposite direction to actuate the other micro switch and again deenergize the motor, the member 59, however, having meanwhile been brought to a positive and precise stop at its initial position.

As a safety precaution, drum 244 preferably is driven from the egar box 245 through engaging clutch plates 250 and 251, plate 250 being secured to the output of the gear train and plate 251 being suitably secured to drum 244. These clutch plates are yieldably urged toward each other with a pressure determined by the compression of a laterally offset washer type spring 252 which is interposed between pressure plates 253 and 254. Plate 254 bears freely rotatively against the gear case coaxially with clutch plates 250 and 251 but is not connected to the gear train. Similarly, a bolt 255 passes freely through drum 244, clutch plates 250 and 251, gear box 245, pressure plates 253 and 254, washer spring 252, and thence through a plate 256 comprising a portion of the mounting bracket. Bolt 255 serves, upon tightening of nuts 257 thereon, to compress spring 252 between plates 253 and 254 to thus develop pressure between the engaging surfaces of clutch plates 250 and 251.

Motor actuator assemblies generally designated 258, 259 and 260, similar to the aforedescribed shuttle drive 246, for the indexing pins, are employed respectively to drive the welding head and frame W, the electrode pins and frame E, and the indexing pins and frame I.

Actuator assembly 258 is supported on cross beam 73 and its cable 261 extends to and passes around a pair of pulleys 262 which direct opposite ends of the cable fore and aft of the beam for securing in the manner aforedescribed to plate 69a (FIG. 4) as at 263 and to angle 214 as at 264. Pulleys 262 are supported on a bracket 265, in turn, secured to the underside of beam 73.

Actuator assembly 259 is supported on cross beam 64 and its cable 266 extends to and fore and aft from a pair of pulleys 267 supported in a bracket 268, in turn, secured to beam 64, the fore end of cable 266 being secured as at 269 to plate 69a and the aft end being secured as at 270 to angle 214.

Actuator assembly 260 is supported on cross beam 54 and its cable 271 extends to and fore and aft from a pair of pulleys 272 supported in a bracket 273, in turn, secured to beam 54, the fore end of cable 271 being secured as at 274 to plate 69a and the aft end thereof being secured as at 275 to angle 214.

From the foregoing, the operation of the core fabricating machine as herein disclosed should now be fully apparent and, likewise, the features and functions of the welding, electrode, and indexing heads and of the framework and subframes in assuring the desired precision of movement of the welding head and electrode and indexing pin assemblies should also be apparent to thus fulfill the aforestated objects and features of the invention. It will be apparent, for example, that the modular components of the machine are readily adapted for replacement and repair and that the mechanisms of the machine lie largely to the rear of the ribbon and core being fabricated to thus place the fabrication process substantially in full view of and available for ready access of an operator in attendance at the machine. The open skeletal framework, moreover, not only constitutes a light weight structure, but presents the moving mechanisms and parts in full operative surveillance and for ready access in case of need for repairs.

While the invention here involved has been embodied in a single disclosed perferred form, it will be apparent to those skilled in the art, to which the invention most closely relates or appertains, that the same may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes that come within the meaning and range of equivalency of the claims are intended to be embraced therein.

Having thus described our invention, what we claim is new and useful and desire to secure by Letters Patent is:

1. In a welding system of the character disclosed for forming honeycomb core from corrugated metallic ribbon, the combination of indexing pins and electrode pins internested therewith and disposed respectively in supported relation to aligned and abutted nodes of the corrugated ribbon, means including a body of potting material individual to said indexing and electrode pins respectively for holding the same rigidly in spaced parallel relation, said potting material for said electrode pins being electrically insulative, coacting welding wheels individual to said electrode pins and movable as a unit over said aligned and abutted nodes in electrical engagement therewith, and circuit means interconnecting said coacting wheels and electrode pins for passing welding current therebetween as the wheels move over the nodes.

2. In a welding system as in claim 1, means supporting said wheels in spaced parallel relation for said movement over said nodes and over said electrode pins parallel to the axes thereof, and means mounting said indexing and electrode pins for axial movement thereof into and out of mutual internesting relation and for relative shuttling movement transversely to either side of each other.

3. In a welding system, the combination of internesting electrode and indexing pins, a welding wheel head comprising a plurality of unitary welding wheel assemblies each having a wheel aligned with and arranged for movement over and along a pair of aligned and abutting corrugated ribbon nodes supported on one of said electrode pins, said head comprising operatively interconnected first, second and third support plates, said third support plate being interposed between the first and second support plates and having vertically directed sliding connections with the first support plate and horizontally directed sliding connections with said second support plate, said second support plate having said unitary wheel sub-assemblies secured thereto, means including the first support plate and supporting said head for said movement of each wheel in alignment with its associated nodes and electrode pin, and means mounting said electrode and indexing pins for axial movement thereof into and out of said internesting relation and for relative shuttling movement transversely to either side of each other, frame means supporting said pin and wheel movements and including a cross frame member, a bell crank pivotally supported on said first plate support, a pin secured to said third plate support and operatively engaged by one arm of said bell crank, an apertured bracket secured to said cross frame member, a rod slidably supported in said apertured bracket and operatively connected at one end thereof to the other end of said bell crank, and a pair of stop collars secured to said rod in spaced relation thereon and disposed on opposite sides of said apertured bracket whereby said bell crank is pivoted to laterally shift said second plate support and wheels supported thereon thereby to align the wheels with adjacently disposed electrode pins and ribbon nodes supported thereon.

4. In welding apparatus of the character disclosed for forming honeycomb core from corrugated metallic ribbon, the combination of internesting indexing and electrode pins, a head for said indexing pins comprising a body of resin for retaining the same in fixed spaced relation, a head for said electrode pins and comprising a body of electrically insulative resin for retaining the same in spaced relation, a welding head comprising a plurality of wheels supported coaxially thereon, a framework comprising a pair of spaced parallel tubes, means mounted on said tubes for supporting said pin heads for axial movement of the indexing and electrode pins into and out of internesting engagement and in supporting relation to aligned and abutting nodes of said ribbon, means mounted on said tubes for supporting said welding head for movement of the wheels over said aligned nodes in electrical engagement therewith, and means mounted on said tubes for supporting said indexing pin head for transverse shuttling movement of the indexing pins to either side of the electrode pins.

5. In welding apparatus as in claim 4, spaced ribbon stripper bars adjustably supported on said tubes and adjustably spaced therealong in accordance with the width of the ribbon for passing the ribbon and fabricated core therebetween, said bars being bridged by said internested pins and disposed in supporting engagement with said electrode pins, said electrode pins being formed of material highly conductive to the welding current, and said stripper bars being formed of material relatively resistant to the flow of the welding current.

6. In welding apparatus as in claim 5, said indexing pins having ribbon stops respectively secured thereto and aligned with one of said stripper bars when the indexing and electrode pins are disposed in internesting relation.

7. In welding apparatus as in claim 5, said welding head having means comprising a plurality of air outlet tubes individual to said wheels and disposed adjacent thereto for directing jets of air against a ribbon section to be added to the core and by reflection to the wheels as the welding current passes between the electrode pins and wheels and through the aligned nodes, thereby to urge said ribbon section against the electrode pins and additionally to air cool the wheels.

8. In a welding system, a modular component comprising a pin holder having a recess, a plurality of elongated pins disposed in spaced relation within a common plane and each having an end portion disposed within said holder recess, and a body of potting resin disposed within said recess for securing said pins therewithin, said pins being formed of electrically conductive material and respectively having conductor leads and connectors for connecting the conductor leads to the pins, said resin comprising an epoxy reisn enclosing and potting said connectors in supporting relation therewithin.

9. In a welding system of the character disclosed for forming honeycomb core from corrugated metallic ribbon, the combination of indexing pins and electrode pins internested therewith and disposed respectively in supported relation to aligned and abutted nodes of the corrugated ribbon, means individual to said indexing and electrode pins respectively for holding the same electrically insulated from each other and rigidly in closely spaced parallel relation, coacting welding wheels individual to said electrode pins and movable as a unit over said aligned and abutted nodes in electrical engagement therewith, circuit means interconnecting said coacting wheels and electrode pins for passing welding current therebetween as the wheels move over the nodes, each of said welding wheels being formed of highly conductive material, a rotative journal support for each said wheel having a side anti-wobble annular bearing surface concentric with the wheel axis and complementary to and slidably engaged with a side surface thereof, said rotative support being formed of a bearing material complementary to that of the wheel, and a fixed support having said rotative support secured thereto and having a side anti-wobble annular bearing surface concentric with the wheel axis and complementary to and slidably engaged with the opposite side surface of the wheel, said fixed support being formed of a highly conductive material and said annular anti-wobble surface thereof in slidable engagement with the complementary surface of the wheel comprising a sliding electrical contact for passing welding current between the wheel and the fixed support.

10. In a welding system as in claim 9, said rotative support having a hub, each said wheel having a central aperture for receiving the hub as a journal support therefor, and means for securing said hub to said fixed support.

11. In a welding system as in claim 10, said fixed support having a countersunk opening concentric with said annular anti-wobble surface thereof, said hub having a central threaded opening, and said securing means comprising a screw threadedly received in said hub opening and having a tapered head seated in said countersunk opening in the fixed support.

12. In a welding system of the character disclosed for forming honeycomb core from corrugated metallic ribbon, the combination of indexing pins and electrode pins internested therewith and disposed respectively in supported relation to aligned and abutted nodes of the corrugated ribbon, means individual to said indexing and electrode pins respectively for holding the same electrically insulated from each other and rigidly in closely spaced parallel relation, coacting welding wheel assemblies respectively comprising wheels individual to said electrode pins and movable over said aligned and abutted nodes in electrical engagement therewith, and circuit means interconnecting said coacting wheels and electrode pins for passing welding current therebetween as the wheels move over the nodes, each of said wheel assemblies being in the form of a modular component comprising a welding wheel of conductive material, a first wheel support of conductive material, complementary annular sliding electrical contact surfaces on confronting side faces of said wheel and support for passing welding current therebetween, a rotative support of complementary bearing material for said wheel secured to said first support, complementary annular bearing surfaces on confronting side faces of the wheel and said rotative support, a second wheel support extending substantially normally of and pivotally secured to said first support for limited pivotal movement about an axis parallel to the wheel axis, adjustable stop means on said first and second supports limiting said pivotal movement therebetween, and adjustable spring means interposed under compression between said first and second supports for urging the same yieldably against said stop means.

13. In a welding system as in claim 12, said second support having a central opening concentric with said pivot axis, a journal support for said second support having a hub disposed in said central opening and secured to said first support, said first and second supports having complementary annular anti-wobble bearing surfaces provided on confronting faces thereof and disposed concentrically of said pivot axis, said second support and said journal support therefor having complementary annular anti-wobble bearing surfaces provided on confronting faces and disposed concentrically of said pivot axis.

References Cited by the Examiner
UNITED STATES PATENTS

| | | | |
|---|---|---|---|
| 1,012,549 | 12/11 | Hoffman et al. | 219—292 X |
| 1,386,300 | 8/21 | Xardell | 219—290 X |
| 2,205,680 | 6/40 | Caputo | 219—84 |
| 2,301,646 | 11/42 | Stapleton | 219—289 |
| 2,918,564 | 12/59 | Russell | 219—84 |
| 3,028,481 | 4/62 | Covert | 219—80 |
| 3,051,824 | 8/62 | Wilson | 219—80 |

RICHARD M. WOOD, *Primary Examiner.*